(12) United States Patent
Miyamura et al.

(10) Patent No.: US 11,189,316 B1
(45) Date of Patent: Nov. 30, 2021

(54) ADAPTIVE TAPE CALIBRATION CRITERIA BY NUMBER OF STOP WRITES

(71) Applicant: International Business Machines Corporation, Armonk, NY (US)

(72) Inventors: Tsuyoshi Miyamura, Yokohama (JP); Keisuke Tanaka, Tokyo (JP); Ernest Stewart Gale, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/173,590

(22) Filed: Feb. 11, 2021

(51) Int. Cl.
  *G11B 20/18* (2006.01)
  *G11B 19/04* (2006.01)
  *G11B 27/36* (2006.01)
  *G11B 5/008* (2006.01)

(52) U.S. Cl.
  CPC ........ *G11B 19/048* (2013.01); *G11B 5/00813* (2013.01); *G11B 27/36* (2013.01)

(58) Field of Classification Search
  CPC ......... G11B 27/36; G11B 20/18; G11B 19/00; G11B 5/54; G11B 5/59633; G11B 5/59638
  USPC .......................................... 360/31, 53, 75, 69
  See application file for complete search history.

(56) References Cited

U.S. PATENT DOCUMENTS

| | | | |
|---|---|---|---|
| 8,132,050 | B2 | 3/2012 | Bates |
| 9,424,877 | B2 | 8/2016 | Judd |
| 9,640,208 | B2 * | 5/2017 | Poorman ................ G11B 5/584 |
| 2016/0189737 | A1 | 6/2016 | Poorman |
| 2020/0168246 | A1 | 5/2020 | Biskeborn |

FOREIGN PATENT DOCUMENTS

| | | |
|---|---|---|
| JP | 2002150515 A | 5/2002 |
| JP | 2004508974 A | 3/2004 |

\* cited by examiner

*Primary Examiner* — Nabil Z Hindi
(74) *Attorney, Agent, or Firm* — Donald G. Weiss (57) ABSTRACT

In an approach to adaptive tape calibration criteria based on the number of stop writes, the number of rewrite occurrences caused by a stop write is determined for each specific tape drive type. Responsive to detecting a stop write during a write operation, the total number of stop writes is stored on the tape drive. A rewrite calibration threshold is determined, where the rewrite calibration threshold includes the total number of stop writes on the tape drive and a calibration reference value for the specific tape drive type. Responsive to the number of rewrite occurrences caused by the stop write exceeding the rewrite calibration threshold while writing a data set on the tape drive, a calibration of the tape drive is performed.

25 Claims, 5 Drawing Sheets

FIG. 1

| REGION | WRAP | CO REWRITES | STOP WRITES |
|---|---|---|---|
| 1 | 0 | 2853 | 647 |
| 2 | 0 | 1628 | 0 |

FIG. 2a

| REGION | WRAP | CO REWRITES | STOP WRITES |
|---|---|---|---|
| 21 | 0 | 1634 | 0 |
| 22 | 0 | 1625 | 0 |
| 23 | 0 | 1830 | 25 |
| 24 | 0 | 1623 | 0 |

ADAPTIVE TAPE CALIBRATION CRITERIA BY NUMBER OF STOP WRITES

BACKGROUND

The present invention relates generally to the field of tape-based data storage, and more particularly to adaptive tape calibration criteria based on the number of stop writes.

Magnetic tape data storage is a system for storing digital information on magnetic tape using digital recording. Today, most magnetic tape is packaged in cartridges and cassettes. Since much of the data recorded today does not need to be accessed immediately, magnetic tape is a preferable solution for long-term data storage. Although the technology may seem outdated, it has advanced tremendously since its introduction. The first commercial digital-tape storage system stored roughly a megabyte of data on one reel of tape, but modern cartridges hold 15 terabytes or more, and the capacity is constantly increasing.

The reason magnetic tape drives are still in use today, especially as an offline data backup, is because of long archival stability and very favorable unit costs. Although data stored on tape cannot be accessed as quickly as data stored on hard drives, the storage is more energy efficient and reliable. Magnetic tape storage is also more cost effective, typically as little as one-sixth the cost to store the same amount of data on a disk. And while the rate for increasing capacity for disc drives is decreasing, the capacity for storage on magnetic tape still increases approximately 33 percent each year.

On a tape drive, a channel is the process of converting a digital signal into an analog signal and outputting the analog signal from the data track to a tape or reading the analog signal from the tape and converting it into a digital signal. Depending on the state of each head element, the channel determines the optimum values of various parameters based on the amount of current flowing through the head in order to optimize the signal input and output. The values are stored in the tape drive vital product data (VPD), which is the non-volatile memory of the tape drive, for each head. When reading or writing data to or from tape, the values saved in the VPD are set in the registers of the components that control the channel.

These channel parameters are adjusted at the time of initial configuration immediately after shipment of the tape drive, or when it is necessary to reconfigure the values due to deterioration of the head or the state of the tape media. This adjustment is called calibration. Calibration is a procedure to adjust the channel settings of each track. When performing calibration, various parameters are optimized by moving to an area on the tape media where user data is not written and repeatedly writing and reading data until the optimal values are determined. For example, during calibration data is written to the tape while changing the voltage/amplitude level of each track, then the signal to noise ratio is measured as the data is read back. Calibration then selects the channel parameters from the best result of each track independently. This calibration process takes time, which reduces the transfer rate of the tape drive since new data cannot be written while the calibration is being performed.

In recent years, with the increase in capacity, the area per bit (linear density times track width) when a tape drive writes to tape media has become extremely narrow. For example, it is necessary to align the head position on the track before writing. If both the drive and the media are in good condition, there is no problem in aligning, but if the condition deteriorates after being used, it will be difficult to align with the track width. If the drive writes the data in a state where it cannot be aligned correctly, the data written on other tracks may be overwritten or the drive may not be able to read the data. If the drive determines that the head is not aligned properly on the track, it terminates writing to the tape. This is called a stop write. The writing is resumed when the position of the head returns on the track, but the number of rewrites increases when a stop write occurs.

An increasing number of users are concerned about the decrease in transfer rate due to calibration. These users want a tape drive that does not perform calibration when it is unnecessary. One such case where calibration is unnecessary is when calibration is attempting to reduce rewrites which are actually caused by stop writes, since calibration cannot fix stop writes. The problem addressed by the present invention is to avoid calibration of the tape drive, which reduces tape throughput, when the rewrites are caused by stop writes.

SUMMARY

Embodiments of the present invention include a computer-implemented method, computer program product, and system for adaptive tape calibration criteria based on the number of stop writes. In a first embodiment, the number of rewrite occurrences caused by a stop write is determined for each specific tape drive type. Responsive to detecting a stop write during a write operation, the total number of stop writes is stored on the tape drive. A rewrite calibration threshold is determined, where the rewrite calibration threshold includes the total number of stop writes on the tape drive and a calibration reference value for the specific tape drive type. Responsive to the number of rewrite occurrences caused by the stop write exceeding the rewrite calibration threshold during a write operation on the tape drive, a calibration of the tape drive is performed.

Embodiments of the present invention include a computer-implemented method and computer program product for adaptive tape calibration criteria based on the number of stop writes. In a second embodiment, a rewrite calibration threshold for a tape drive is determined, where the rewrite calibration threshold includes the total number of rewrites based on stop writes on the tape drive and a calibration reference value for the specific tape drive type. Responsive to the number of rewrite occurrences caused by stop writes exceeding the rewrite calibration threshold during a write operation on the tape drive, a calibration of the tape drive is performed.

DETAILED DESCRIPTION

In a tape drive, a writing head and a reading head are arranged in pairs, and during a write operation, immediately after writing data on the tape media, the reading head reads back the data from the tape. If the read data does not match the written data, the drive writes the unwritten data with another head. The mechanism to write again is called a rewrite. While moving the tape and writing data, the tape drive counts the frequency of rewrites and determines whether calibration is necessary. When the tape approaches the calibration area after it has been determined that calibration is necessary, calibration is performed to optimize the channel parameters.

In the present invention, the influence on the rewrite due to stop writes when the head cannot be aligned on the track is examined. When it becomes difficult to align the head on the track due to media deterioration from repeated use of tape media, or by debris on the drive head, the frequency of rewrites always increases at a constant rate. Since the influence of stop writes is not taken into consideration, even if rewrite occurs with a small amount of debris, the frequency of occurrence of rewrites may exceed the threshold value and an unnecessary calibration is performed, which causes a decrease in transfer rate.

Embodiments of the present invention describe a mechanism for changing the reference value for calibration caused by rewrites to take into consideration of the number of rewrites caused by stop writes when they are detected.

A data set is the smallest unit that a tape drive writes to tape. In an example of a typical tape drive, e.g., an LTO tape drive with 32 head elements, the data set consists of 192 Codeword Interleave (CWI) set data units, which are written simultaneously using the 32 heads. In an embodiment, for each specific type of tape drive product, the frequency of rewrites for each number of stop writes is measured in advance. Every time the data set is written, the tape drive records the number of stop writes per dataset in the non-volatile memory of the tape drive in parallel with writing the data.

In an embodiment, when deciding whether to perform calibration, the frequency of rewrite occurrences corresponding to the number of stop writes is added to the reference value of the number of rewrites required to perform calibration. In an embodiment, whether to perform a calibration is determined by comparing the reference value of rewrites including the number of rewrites due to stop writes with the frequency of rewrites occurring during actual writing.

Figure 1:
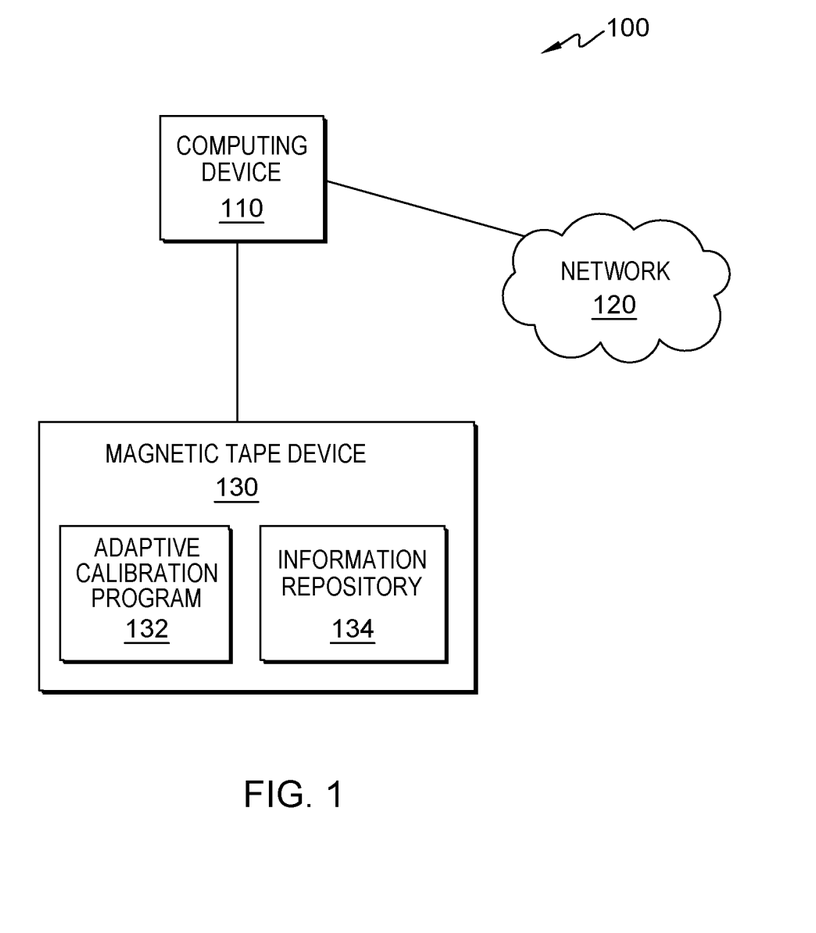
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of adaptive calibration program 132 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120 and magnetic tape device 130 connected to computing device 110. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In an embodiment, magnetic tape device 130 includes adaptive calibration program 132. In an embodiment, adaptive calibration program 132 is a program, application, or subprogram of a larger program for adaptive tape calibration criteria based on the number of stop writes.

In an embodiment, magnetic tape device 130 includes information repository 134. In an embodiment, information repository 134 may be managed by adaptive calibration program 132. In an alternate embodiment, information repository 134 may be managed by the operating system of the device, alone, or together with, adaptive calibration program 132. Information repository 134 is a data repository that can store, gather, compare, and/or combine information. In some embodiments, information repository 134 is located externally to magnetic tape device 130 and accessed through a communication network, such as network 120. In some embodiments, information repository 134 is stored on magnetic tape device 130. In some embodiments, information repository 134 may reside on another computing device (not shown), provided that information repository 134 is accessible by magnetic tape device 130. Information repository 134 includes, but is not limited to, tape drive configuration data, tape drive error data, tape cartridge error data, tape calibration data, storage system configuration data, filesystem data, and other data that is received by adaptive calibration program 132 from one or more sources, and data that is created by adaptive calibration program 132.

Information repository 134 may be implemented using any volatile or non-volatile storage media for storing information, as known in the art. Similarly, information repository 134 may be implemented with any suitable storage architecture known in the art, such as a relational database, an object-oriented database, or one or more tables.

Figure 2A:
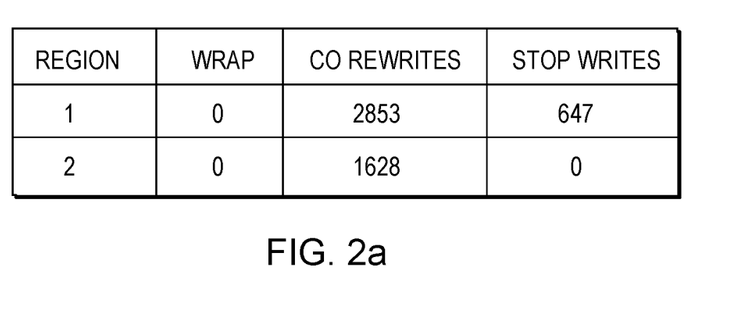
FIG. 2a and FIG. 2b illustrate an example of determining the number of rewrites caused by stop writes, in accordance with an embodiment of the present invention.
Figure 2B:
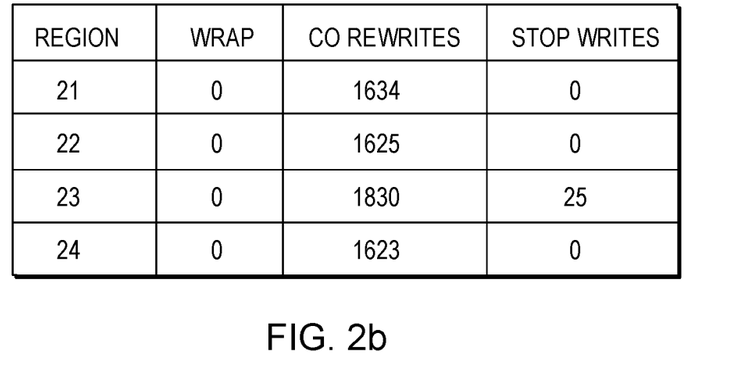

FIG. 2a and FIG. 2b illustrate an example of determining the number of rewrites caused by stop writes, in accordance with an embodiment of the present invention. In the example of FIGS. 2a and 2b, approximately 1000 meters of tape length were divided into 80 areas to record statistic information for each area. The information recorded includes the number of occurrences of stop writes and rewrites within each area. In the tables of FIGS. 2a and 2b, Region indicates an area number, Wrap indicates the identification of a written track, CO Rewrite indicates the number of rewrites, and Stop Writes indicates the number of stop writes.

The table shown in FIG. 2a displays the number of occurrences of rewrites and stop writes in Regions 1 and 2. The table shown in FIG. 2b shows that the occurrences of rewrites and stop writes became 0 in Regions 21, 22, and 24. From this data it can be understood that approximately 1628 rewrites occurred per area even though there were no stop writes. In Region 1, 2853 rewrites occurred relative to occurrence of 647 stop writes, and the number of occurrences of retry caused by a stop write is 2853 (Region 1)−1628 (Region 2)=1225. Therefore, the number of occurrences of rewrite per each occurrence of stop write is 1225/647=1.89, i.e., about 2. In other words, for each stop write, approximately 2 rewrites are performed by the tape drive. It should be noted that the calculation of rewrites per stop right is an approximation since this value is only used to determine a threshold for calibration.

The table shown in FIG. 2b shows that the occurrences of rewrites and stop writes in Region 23 is 1830 and 25, respectively. Since the number of rewrites in Regions 21, 22, and 24 does not include any rewrites due to stop writes, all the rewrites in these regions are due to other causes. Therefore, a baseline number of rewrites for these regions is about 1630, and the number of rewrites due to stop writes is about 200. This makes the ratio of rewrites per stop write approximately 8 for these regions.

Therefore, as a criterion for rewrite to determine whether to perform calibration in this drive, the minimum value, 2, is preferably used. This avoids many unnecessary calibration operations but does not use the higher threshold that was only found in the small sample of Regions 21-24.

Accordingly, to determine whether a calculation should be performed on the drive, a value obtained by multiplying the number of stop writes by 2 is added to the criterion for rewrites predetermined for the specific drive type, which is compared with the number of occurrences of rewrites per data set during actual writing.

For example, when the number of occurrences of stop write in a data set is n, the number of occurrences of rewrite is 2n. In an example case of a tape drive with 9 set as a criterion for calibration, when, 5 or more stop writes occur, the number of rewrites reaches 10 even if there is no problem in the drive (i.e., 2 rewrites per stop write time 5 stop writes). In the existing art, the conventional method of calibration determination causes the execution of an unnecessary calibration because the number of rewrites exceeds the criterion of 9, even though the rewrites are caused by stop writes, which cannot be corrected by calibration. By using the present invention however, the rewrites caused by stop writes will change the criterion to 9+2n=19 in this example, and the unnecessary calibration is avoided. In other words, the present invention considers rewrites caused by stop writes, and only performs calibration when truly necessary.

Figure 3:
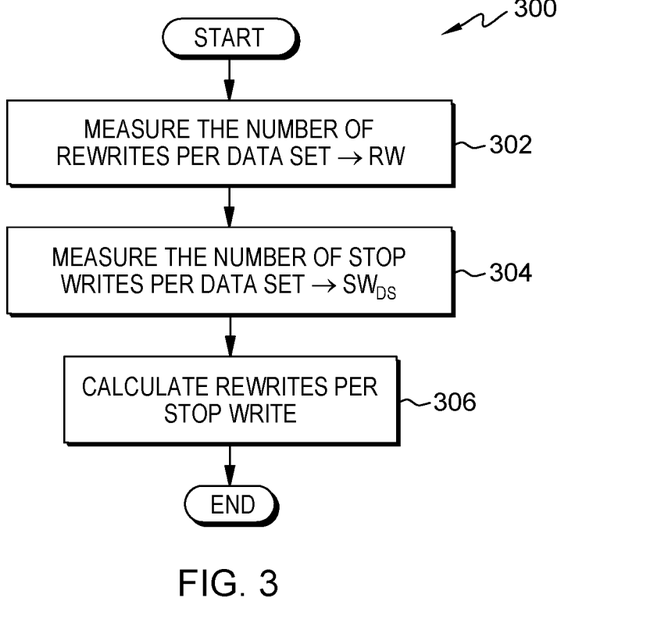
FIG. 3 is a flowchart depicting operational steps performed by the adaptive calibration program for the preparation procedure, where the number of occurrences of rewrite caused by each occurrence of stop write is determined during a write operation for one data set, on a magnetic tape device within the distributed data processing environment of FIG. 1, in accordance with an embodiment of the present invention.

FIG. 3 is a flowchart depicting operational steps performed by adaptive calibration program 132 for the preparation procedure, where a ratio is calculated for the number of rewrites caused by each occurrence of a stop write during a write operation for one data set, on a magnetic tape device within the distributed data processing environment of FIG. 1, in accordance with an embodiment of the present invention. In an alternative embodiment, the steps of workflow 300 may be performed by any other program while working with adaptive calibration program 132. In an embodiment, adaptive calibration program 132 measures the number of rewrites on a drive for each data set that is being analyzed. In an embodiment, adaptive calibration program 132 measures the number of stop writes on a drive for each data set that is being analyzed. In an embodiment, adaptive calibration program 132 calculates the rewrites per stop write.

It should be appreciated that embodiments of the present invention provide at least for the preparation procedure of adaptive calibration program 132, where the number of occurrences of rewrite caused by each occurrence of stop write is determined during a write operation for one data set. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Adaptive calibration program 132 measures the number of rewrites per data set →RW (step 302). In an embodiment, adaptive calibration program 132 measures the number of rewrites caused by a stop write on a drive for each data set that is being analyzed. In an embodiment, the number of data sets analyzed is a system default. In another embodiment, the number of data sets analyzed is received from a user or system administrator. In an embodiment, adaptive calibration program 132 stores this value in RW. In the example of FIGS. 2a and 2b above, 80 areas were analyzed to determine the number of rewrites.

Adaptive calibration program 132 measures the number of rewrites on a good drive →$SW_{DS}$ (step 304). In an embodiment, adaptive calibration program 132 measures the number of stop writes on a drive for each data set that is being analyzed. In an embodiment, the number of data sets analyzed is a system default. In another embodiment, the number of data sets analyzed is received from a user or system administrator. In an embodiment, adaptive calibration program 132 stores this value in $SW_{DS}$. In the example of FIGS. 2a and 2b above, 80 areas were analyzed to determine the number of stop writes.

Adaptive calibration program 132 calculates rewrites per stop write (step 306). In an embodiment, adaptive calibration program 132 calculates the ratio of rewrites per stop write using formula (1).

$$R = RW/SW_{DS} \qquad (1)$$

In an embodiment, the ratio of rewrites per stop write are measured on not only the drive currently in use but are also measured on drives that are used for internal testing to establish a baseline ratio for rewrites and stop writes. In an embodiment, adaptive calibration program 132 then ends for this cycle.

Figure 4:
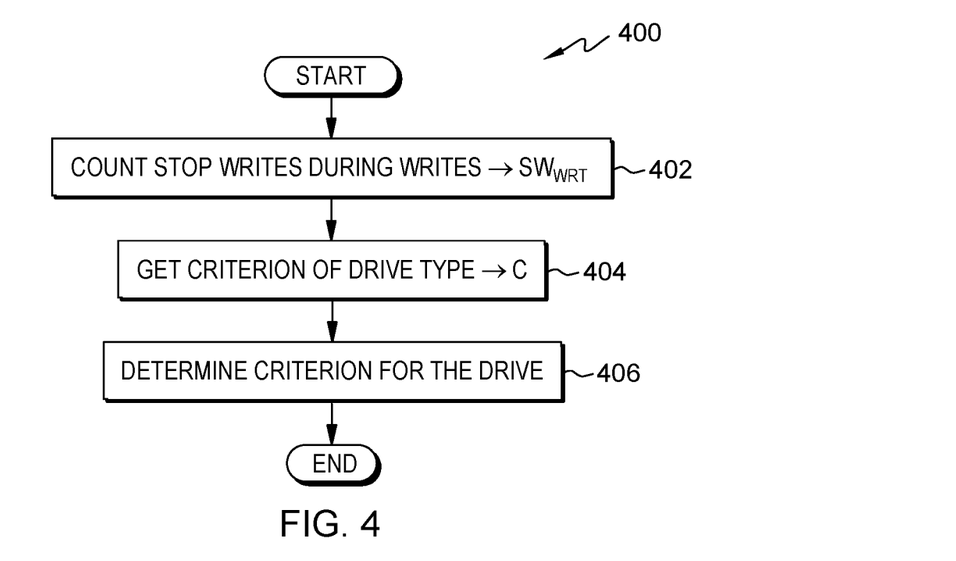
FIG. 4 is a flowchart depicting operational steps performed by the adaptive calibration program for determining a criterion for rewrites based on the number of occurrences of stop write while writing a data set, on a magnetic tape device within the distributed data processing environment of FIG. 1, in accordance with an embodiment of the present invention.

FIG. 4 is a flowchart depicting operational steps performed by adaptive calibration program 132 for determining a criterion for rewrites based on the number of occurrences of stop write while writing a data set, on a magnetic tape device within the distributed data processing environment of FIG. 1, in accordance with an embodiment of the present invention. In an alternative embodiment, the steps of workflow 400 may be performed by any other program while working with adaptive calibration program 132. In an embodiment, adaptive calibration program 132 retrieves the number of occurrences of stop writes during writing determined in FIG. 2 and stores this value in $SW_{WRT}$. In an embodiment, adaptive calibration program 132 retrieves the criterion value for this drive type and stores the value in C. In an embodiment, adaptive calibration program 132 calculates a specific reference value for the specific drive by taking the number of stop writes into consideration. In an embodiment, adaptive calibration program 132 then ends for this cycle.

It should be appreciated that embodiments of the present invention provide at least for operational steps performed by adaptive calibration program 112 for determining a criterion for rewrites based on the number of occurrences of stop write while writing a data set. However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

Adaptive calibration program 132 counts the number of stop writes during writes →$SW_{WRT}$ (step 402). In an embodiment, adaptive calibration program 132 counts the number of occurrences of stop writes during a data writing operation and stores this value in $SW_{WRT}$.

Adaptive calibration program 132 gets the criterion of drive type →C (step 404). In an embodiment, adaptive calibration program 132 retrieves the criterion value for this drive type and stores the value in C. In an embodiment, the criterion value is a reference value of rewrites measured in advance for each type of drive that is used to determine whether calibration should be performed.

Adaptive calibration program 132 determines a criterion for the drive Cd (step 406). In an embodiment, adaptive calibration program 132 calculates a specific reference value, or criterion, for the specific drive by taking the number of stop writes into consideration. In an embodiment, adaptive calibration program 132 calculates the specific reference value for the specific drive, Cd, using formula (2).

$$Cd=C+(SW_{WRT} \times (RW/SW_{DS})) \qquad (2)$$

In an embodiment, formula (2) takes the number of stop writes into consideration to determine whether to perform calibration. In an embodiment, $SW_{WRT}$ is the number of stop writes encountered during the current write cycle, while $RW/SW_{DS}$ is the ratio of rewrites per stop write as determined in FIG. 3 above. In an embodiment, Cd is calculated to determine if the number of rewrites exceed the number of rewrites caused by stop writes plus the criterion value C for this drive type. This is done because if the number of rewrites not caused by stop writes exceeds a threshold, then a calibration may correct the rewrites. In an embodiment, adaptive calibration program 132 then ends for this cycle.

Figure 5:
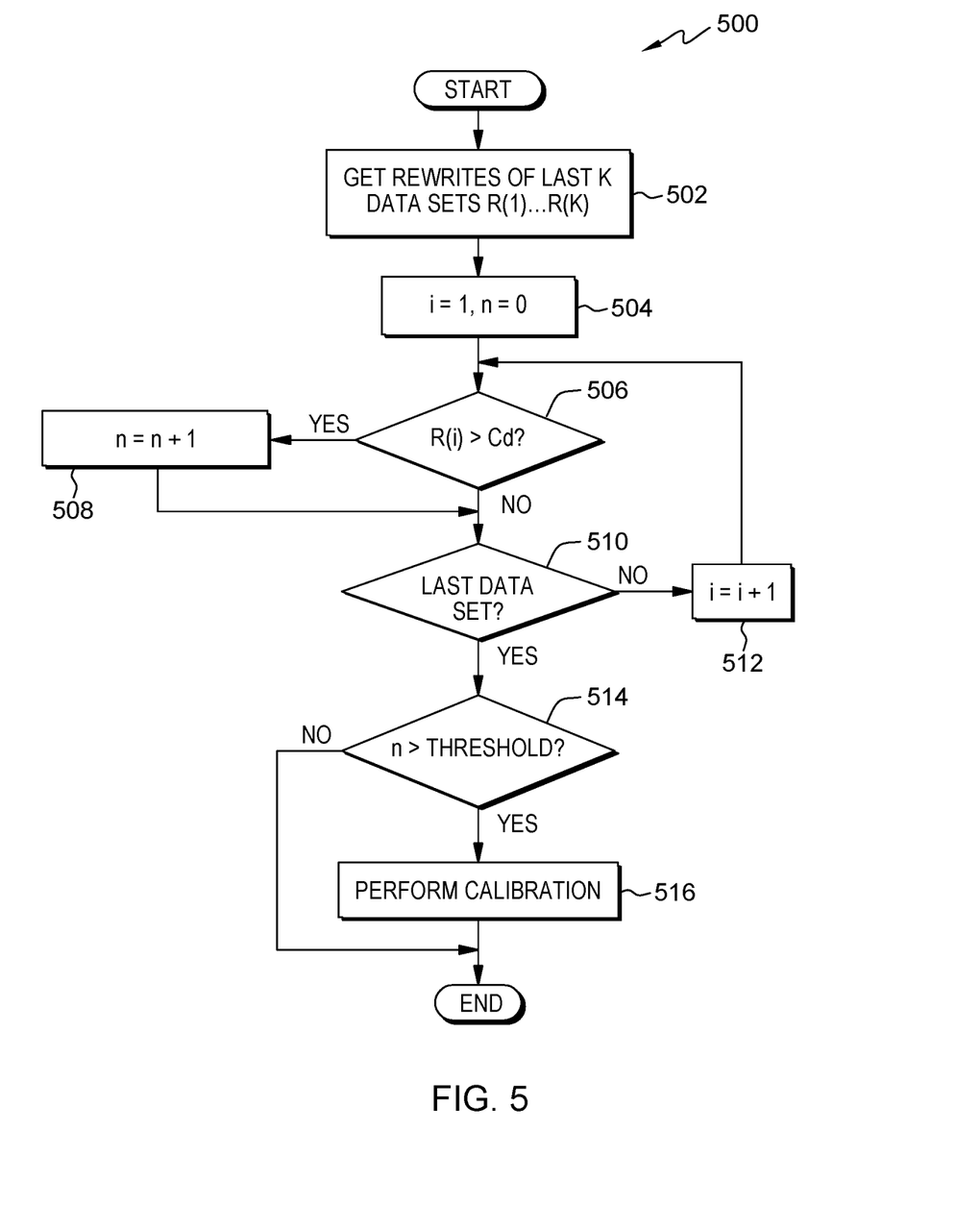
FIG. 5 is a flowchart depicting operational steps performed by the adaptive calibration program for determining whether calibration should be performed, on a magnetic tape device within the distributed data processing environment of FIG. 1, in accordance with an embodiment of the present invention.

FIG. 5 is a flowchart depicting operational steps performed by adaptive calibration program 132 for determining whether calibration should be performed, on a magnetic tape device within the distributed data processing environment of FIG. 1, in accordance with an embodiment of the present invention. In an alternative embodiment, the steps of workflow 500 may be performed by any other program while working with adaptive calibration program 132.

In an embodiment, R(K) is the number of occurrences of rewrite encountered while writing the prior K data sets. In an embodiment, R(i), which is the number of occurrences of rewrite encountered while writing the i-th data set, is compared to the criterion Cd for use in determining whether to perform calibration. When the number of occurrences of rewrite is greater than the criterion, one is added to the count (n). When the number of counts obtained in the past comparison for K data sets is greater than a threshold, a calibration is performed.

In an embodiment, adaptive calibration program 132 retrieves the number of rewrites for the last K data set writes and stores them in R(1) through R(K). In an embodiment, adaptive calibration program 132 uses counter i to count the number of data sets, i.e., i counts from 1 to K, and n is used to count the total number of data sets where the number of rewrites exceeded a predetermined threshold. In an embodiment, adaptive calibration program 132 determines if the number of rewrites for data set i, i.e., R(i), exceeds a predetermined threshold Cd. In an embodiment, if adaptive calibration program 132 determines that the number of rewrites for data set i does exceed the predetermined threshold Cd, then adaptive calibration program 132 increments the count of the total number of data sets where the number of rewrites exceeded a predetermined threshold. In an embodiment, adaptive calibration program 132 determines whether the last data set has been analyzed, i.e., if i<K, then there are data sets remaining to analyze. In an embodiment, if adaptive calibration program 132 determines that the last data set has not been analyzed, then adaptive calibration program 132 increments the counter, i, to analyze the next data set. In an embodiment, adaptive calibration program 132 determines if the total count of all the data sets where the number of rewrites exceeded a threshold itself exceeds another predetermined threshold. In an embodiment, if adaptive calibration program 132 determines that the total count of all the data sets where the number of rewrites exceeded a threshold itself exceeds another predetermined threshold, then adaptive calibration program 132 performs a calibration. Adaptive calibration program 132 then ends for this cycle.

It should be appreciated that embodiments of the present invention provide at least for the operational steps performed by adaptive calibration program 132 for determining whether calibration should be performed. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 5 is illustrates one possible iteration of the operational steps performed by adaptive calibration program 132 for determining whether calibration should be performed, which repeats each time a calibration is set to be performed.

Adaptive calibration program 132 get the rewrites of last K data sets R(1) . . . R(K) (step 502). In an embodiment, adaptive calibration program 132 retrieves the number of rewrites for the last K data set writes and stores them in R(1) through R(K). In an embodiment, adaptive calibration program 132 retrieves the number of rewrites for the last K data set writes from the memory in the tape drive.

Adaptive calibration program 132 sets i=1, n=0 (step 504). In an embodiment, adaptive calibration program 132 uses counter i to count the number of data sets, i.e., i counts from 1 to K, and n is used to count the total number of data sets where the number of rewrites exceeded a predetermined threshold.

Adaptive calibration program 132 determines if R(i)>Cd (decision block 506). In an embodiment, adaptive calibration program 132 determines if the number of rewrites for data set i, i.e., R(i), exceeds a predetermined threshold Cd. In an embodiment, the predetermined threshold Cd is the reference value determined in FIG. 4. In an embodiment, if adaptive calibration program 132 determines the number of rewrites for data set i does not exceed the predetermined threshold Cd ("no" branch, decision block 506), then adaptive calibration program 132 proceeds to decision block 510 to check the next data set. In an embodiment, if adaptive calibration program 132 determines that the number of rewrites for data set i does exceed the predetermined threshold Cd ("yes" branch, decision block 506), then adaptive calibration program 132 proceeds to step 508 to increment the count of the total number of data sets where the number of rewrites exceeded a predetermined threshold.

Adaptive calibration program 132 sets n=n+1 (step 508). In an embodiment, if adaptive calibration program 132 determines that the number of rewrites for data set i does exceed the predetermined threshold Cd, then adaptive calibration program 132 increments the count, n, of the total number of data sets where the number of rewrites exceeded a predetermined threshold.

Adaptive calibration program 132 determines if this is the last data set (decision block 510). In an embodiment, adaptive calibration program 132 determines whether the last data set has been analyzed, i.e., if i<K, then there are data sets remaining to analyze. In an embodiment, if adaptive calibration program 132 determines that the last data set has not been analyzed ("no" branch, decision block 510), then adaptive calibration program 132 proceeds to step 512 to check the next data set. In an embodiment, if adaptive calibration program 132 determines that the last data set has been analyzed ("yes" branch, decision block 510), then adaptive calibration program 132 proceeds to decision block 514 to determine if the count of exceeded a predetermined threshold.

Adaptive calibration program 132 sets i=i+1 (step 512). In an embodiment, if adaptive calibration program 132 determines that the last data set has not been analyzed, then adaptive calibration program 132 increments the counter, i, to analyze the next data set. In an embodiment, adaptive calibration program 132 then returns to decision block 506 to check the next data set.

Adaptive calibration program 132 determines if n is greater than a threshold (decision block 514). In an embodiment, adaptive calibration program 132 determines if the total count of all the data sets where the number of rewrites exceeded a threshold itself exceeds another predetermined threshold. In an embodiment, if adaptive calibration program 132 determines that the total count of all the data sets where the number of rewrites exceeded a threshold itself exceeds another predetermined threshold ("yes" branch, decision block 514), then adaptive calibration program 132 proceeds to step 516 to perform a calibration. In an embodiment, if adaptive calibration program 132 determines that the total count of all the data sets where the number of rewrites exceeded a threshold did not itself exceed another predetermined threshold ("no" branch, decision block 514), then adaptive calibration program 132 ends for this cycle.

Adaptive calibration program 132 performs a calibration (step 516). In an embodiment, if adaptive calibration program 132 determines that the total count of all the data sets where the number of rewrites exceeded a threshold itself exceeds another predetermined threshold, then adaptive calibration program 132 performs a calibration. Adaptive calibration program 132 then ends for this cycle.

Figure 6:
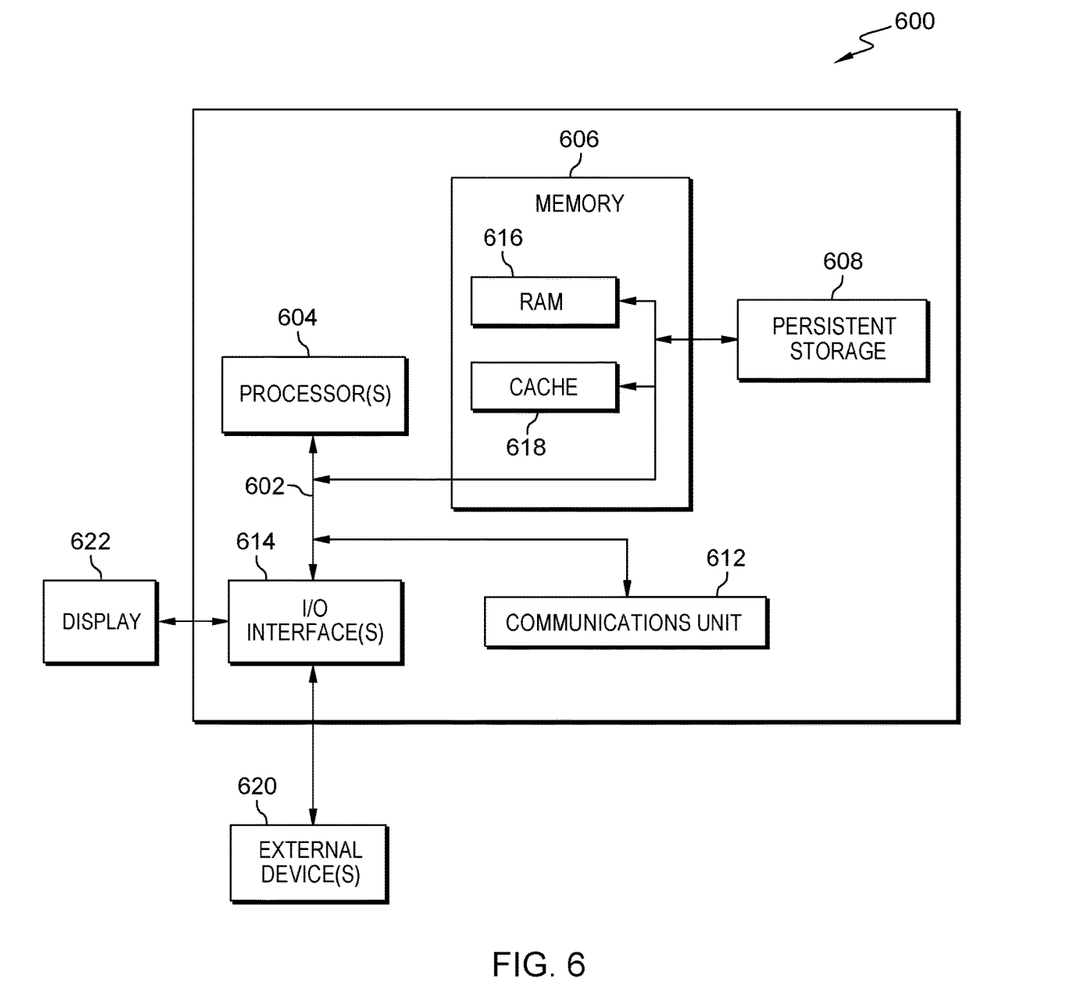
FIG. 6 depicts a block diagram of components of the magnetic tape device executing the adaptive calibration program within the distributed data processing environment of FIG. 1, in accordance with an embodiment of the present invention.

FIG. 6 is a block diagram depicting components of computing device 110 suitable for adaptive calibration program 132, in accordance with at least one embodiment of the invention. FIG. 6 displays computer 600; one or more processor(s) 604 (including one or more computer processors); communications fabric 602; memory 606, including random-access memory (RAM) 616 and cache 618; persistent storage 608; communications unit 612; I/O interfaces 614; display 622; and external devices 620. It should be appreciated that FIG. 6 provides only an illustration of one embodiment and does not imply any limitations with regard to the environments in which different embodiments may be implemented. Many modifications to the depicted environment may be made.

As depicted, computer 600 operates over communications fabric 602, which provides communications between computer processor(s) 604, memory 606, persistent storage 608, communications unit 612, and I/O interface(s) 614. Communications fabric 602 may be implemented with any architecture suitable for passing data or control information between processors 604 (e.g., microprocessors, communications processors, and network processors), memory 606, external devices 620, and any other hardware components within a system. For example, communications fabric 602 may be implemented with one or more buses.

Memory 606 and persistent storage 608 are computer readable storage media. In the depicted embodiment, memory 606 comprises RAM 616 and cache 618. In general, memory 606 can include any suitable volatile or non-volatile computer readable storage media. Cache 618 is a fast memory that enhances the performance of processor(s) 604 by holding recently accessed data, and near recently accessed data, from RAM 616.

Program instructions for adaptive calibration program 132 may be stored in persistent storage 608, or more generally, any computer readable storage media, for execution by one or more of the respective computer processors 604 via one or more memories of memory 606. Persistent storage 608 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links. In the context of some embodiments of the present invention, the source of the various input data may be physically remote to computer 600 such that the input data may be received, and the output similarly transmitted via communications unit 612.

I/O interface(s) 614 allows for input and output of data with other devices that may be connected to computer 600. For example, I/O interface(s) 614 may provide a connection to external device(s) 620 such as a keyboard, a keypad, a touch screen, a microphone, a digital camera, and/or some other suitable input device. External device(s) 620 can also include portable computer readable storage media such as, for example, thumb drives, portable optical or magnetic disks, and memory cards. Software and data used to practice embodiments of the present invention, e.g., adaptive calibration program 132, can be stored on such portable computer readable storage media and can be loaded onto persistent storage 608 via I/O interface(s) 614. I/O interface(s) 614 also connect to display 622.

Display 622 provides a mechanism to display data to a user and may be, for example, a computer monitor. Display 622 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising the steps of:
    determining, by one or more computer processors, a ratio of rewrites per stop write for a specific tape drive type;
    responsive to detecting one or more stop writes during a write operation on a tape drive, storing, by the one or more computer processors, on the tape drive a number of stop writes detected during the write operation;
    determining, by the one or more computer processors, a rewrite calibration threshold; and
    responsive to a first number of rewrites exceeding the rewrite calibration threshold while performing a data write operation on the tape drive, performing, by the one or more computer processors, a calibration of the tape drive.

2. The computer-implemented method of claim 1, wherein determining the rewrite calibration threshold further comprises:
    retrieving, by the one or more computer processors, the number of stop writes detected while writing a data set;
    calculating, by the one or more computer processors, a total stop write rewrites, wherein the total stop write rewrites is calculated by multiplying the number of stop writes detected while writing a data set by the ratio of rewrites per stop write for the specific tape drive type; and
    adding, by the one or more computer processors, the total stop write rewrites to a calibration reference value for the specific tape drive type.

3. The computer-implemented method of claim 1, wherein determining the ratio of rewrites per stop write for the specific tape drive type further comprises:
    measuring, by the one or more computer processors, a second number of rewrites caused by a stop write for each data set of one or more data sets on the specific tape drive type;
    measuring, by the one or more computer processors, a number of stop writes for each data set of one or more data sets on the specific tape drive type; and
    calculating, by the one or more computer processors, the ratio of rewrites per stop write for the specific tape drive type, wherein the ratio of rewrites per stop write for the specific tape drive type is calculated by dividing the second number of rewrites caused by a stop write for each data set of the one or more data sets by the number of stop writes for each data set of the one or more data sets.

4. The computer-implemented method of claim 1, wherein the number of stop writes is stored in a vital product data for the tape drive.

5. The computer-implemented method of claim 1, wherein the ratio of rewrites per stop write for the specific tape drive type is calculated for each specific tape drive type of one or more specific tape drive types.

6. A computer program product, the computer program product comprising one or more computer readable storage media and program instructions stored on the one or more computer readable storage media, the program instructions including instructions to:
    determine a ratio of rewrites per stop write for a specific tape drive type;
    responsive to detecting one or more stop writes during a write operation on a tape drive, store on the tape drive a number of stop writes detected during the write operation;
    determine a rewrite calibration threshold; and
    responsive to a first number of rewrites exceeding the rewrite calibration threshold while performing a data write operation on the tape drive, perform a calibration of the tape drive.

7. The computer program product of claim 6, wherein determine the rewrite calibration threshold further comprises one or more of the following program instructions, stored on the one or more computer readable storage media, to:
    retrieve the number of stop writes detected while writing a data set;
    calculate a total stop write rewrites, wherein the total stop write rewrites is calculated by multiplying the number of stop writes detected while writing a data set by the ratio of rewrites per stop write for the specific tape drive type; and
    add the total stop write rewrites to a calibration reference value for the specific tape drive type.

8. The computer program product of claim 6, wherein determine the ratio of rewrites per stop write for the specific tape drive type further comprises one or more of the following program instructions, stored on the one or more computer readable storage media, to:
    measure a second number of rewrites caused by a stop write for each data set of one or more data sets on the specific tape drive type;

measure a number of stop writes for each data set of one or more data sets on the specific tape drive type; and calculate the ratio of rewrites per stop write for the specific tape drive type, wherein the ratio of rewrites per stop write for the specific tape drive type is calculated by dividing the second number of rewrites caused by a stop write for each data set of the one or more data sets by the number of stop writes for each data set of the one or more data sets.

9. The computer program product of claim 6, wherein the number of stop writes is stored in a vital product data for the tape drive.

10. The computer program product of claim 6, wherein the ratio of rewrites per stop write for the specific tape drive type is calculated for each specific tape drive type of one or more specific tape drive types.

11. A computer system, the computer system comprising:
    one or more computer processors;
    one or more computer readable storage media; and
    program instructions stored on the one or more computer readable storage media for execution by at least one of the one or more computer processors, the stored program instructions including instructions to:
    determine a ratio of rewrites per stop write for a specific tape drive type;
    responsive to detecting one or more stop writes during a write operation on a tape drive, store on the tape drive a number of stop writes detected during the write operation;
    determine a rewrite calibration threshold; and
    responsive to a first number of rewrites exceeding the rewrite calibration threshold while performing a data write operation on the tape drive, perform a calibration of the tape drive.

12. The computer system of claim 11, wherein determine the rewrite calibration threshold further comprises one or more of the following program instructions, stored on the one or more computer readable storage media, to:
    retrieve the number of stop writes detected while writing a data set;
    calculate a total stop write rewrites, wherein the total stop write rewrites is calculated by multiplying the number of stop writes detected while writing a data set by the ratio of rewrites per stop write for the specific tape drive type; and
    add the total stop write rewrites to a calibration reference value for the specific tape drive type.

13. The computer system of claim 11, wherein determine the ratio of rewrites per stop write for the specific tape drive type further comprises one or more of the following program instructions, stored on the one or more computer readable storage media, to:
    measure a second number of rewrites caused by a stop write for each data set of one or more data sets on the specific tape drive type;
    measure a number of stop writes for each data set of one or more data sets on the specific tape drive type; and
    calculate the ratio of rewrites per stop write for the specific tape drive type, wherein the ratio of rewrites per stop write for the specific tape drive type is calculated by dividing the second number of rewrites caused by a stop write for each data set of the one or more data sets by the number of stop writes for each data set of the one or more data sets.

14. The computer system of claim 11, wherein the number of stop writes is stored in a vital product data for the tape drive.

15. The computer system of claim 11, wherein the ratio of rewrites per stop write for the specific tape drive type is calculated for each specific tape drive type of one or more specific tape drive types.

16. A computer-implemented method comprising the steps of:
    determining, by one or more computer processors, a rewrite calibration threshold for a tape drive, wherein the rewrite calibration threshold includes a total number of rewrites based on stop writes on the tape drive and a calibration reference value for a specific tape drive type; and
    responsive to a number of rewrite occurrences caused by stop writes exceeding the rewrite calibration threshold during a write operation on the tape drive, performing, by the one or more computer processors, a calibration of the tape drive.

17. The computer-implemented method of claim 16, wherein determining the rewrite calibration threshold for the tape drive, wherein the rewrite calibration threshold includes the total number of rewrites based on stop writes on the tape drive and the calibration reference value for the specific tape drive type further comprises:
    measuring, by the one or more computer processors, a number of rewrites for each data set of one or more data sets on the specific tape drive type;
    measuring, by the one or more computer processors, a number of stop writes for each data set of one or more data sets on the specific tape drive type; and
    calculating, by the one or more computer processors, a ratio of rewrites per stop write for the specific tape drive type, wherein the ratio of rewrites per stop write for the specific tape drive type is calculated by dividing the number of rewrites for each data set of the one or more data sets by the number of stop writes for each data set of the one or more data sets.

18. The computer-implemented method of claim 17, wherein responsive to the number of rewrite occurrences caused by stop writes exceeding the rewrite calibration threshold during the write operation on the tape drive, performing the calibration of the tape drive further comprises:
    responsive to detecting the stop write during the write operation on the tape drive, adding, by the one or more computer processors, the stop write to a total number of stop writes on the tape drive;
    retrieving, by the one or more computer processors, the total number of stop writes from the tape drive;
    determining, by the one or more computer processors, a total number of stop write rewrites, wherein the total number of stop write rewrites is determined by multiplying the total number of stop writes by the ratio of rewrites per stop write for the specific tape drive type; and
    responsive to the number of stop write rewrites exceeding the rewrite calibration threshold while performing a data write operation on the tape drive, performing, by the one or more computer processors, the calibration of the tape drive.

19. The computer-implemented method of claim 16, wherein the number of rewrite occurrences for each stop write on the tape drive is calculated for each tape drive type of one or more tape drive types.

20. The computer-implemented method of claim 16, wherein the number of stop writes is stored in a vital product data for the tape drive.

21. A computer program product, the computer program product comprising one or more computer readable storage media and program instructions stored on the one or more computer readable storage media, the program instructions including instructions to:
- determine a rewrite calibration threshold for a tape drive, wherein the rewrite calibration threshold includes a total number of rewrites based on stop writes on the tape drive and a calibration reference value for a specific tape drive type; and
- responsive to a number of rewrite occurrences caused by stop writes exceeding the rewrite calibration threshold during a write operation on the tape drive, perform a calibration of the tape drive.

22. The computer program product of claim 21, wherein determine the rewrite calibration threshold for the tape drive, wherein the rewrite calibration threshold includes the total number of rewrites based on stop writes on the tape drive and the calibration reference value for the specific tape drive type further comprises one or more of the following program instructions, stored on the one or more computer readable storage media, to:
- measure a number of rewrites for each data set of one or more data sets on the specific tape drive type;
- measure a number of stop writes for each data set of one or more data sets on the specific tape drive type; and
- calculate a ratio of rewrites per stop write for the specific tape drive type, wherein the ratio of rewrites per stop write for the specific tape drive type is calculated by dividing the number of rewrites for each data set of the one or more data sets by the number of stop writes for each data set of the one or more data sets.

23. The computer program product of claim 22, wherein responsive to a number of rewrite occurrences caused by stop writes exceeding the rewrite calibration threshold during the write operation on the tape drive, perform the calibration of the tape drive further comprises one or more of the following program instructions, stored on the one or more computer readable storage media, to:
- responsive to detecting the stop write during the write operation on the tape drive, add the stop write to a total number of stop writes on the tape drive;
- retrieve the total number of stop writes from the tape drive;
- determine a total number of stop write rewrites, wherein the total number of stop write rewrites is determined by multiplying the total number of stop writes by the ratio of rewrites per stop write for the specific tape drive type; and
- responsive to the number of stop write rewrites exceeding the rewrite calibration threshold while performing a data write operation on the tape drive, perform the calibration of the tape drive.

24. The computer program product of claim 21, wherein the number of rewrite occurrences for each stop write on the tape drive is calculated for each tape drive type of one or more tape drive types.

25. The computer program product of claim 21, wherein the number of stop writes is stored in a vital product data for the tape drive.

* * * * *